Figure 1:
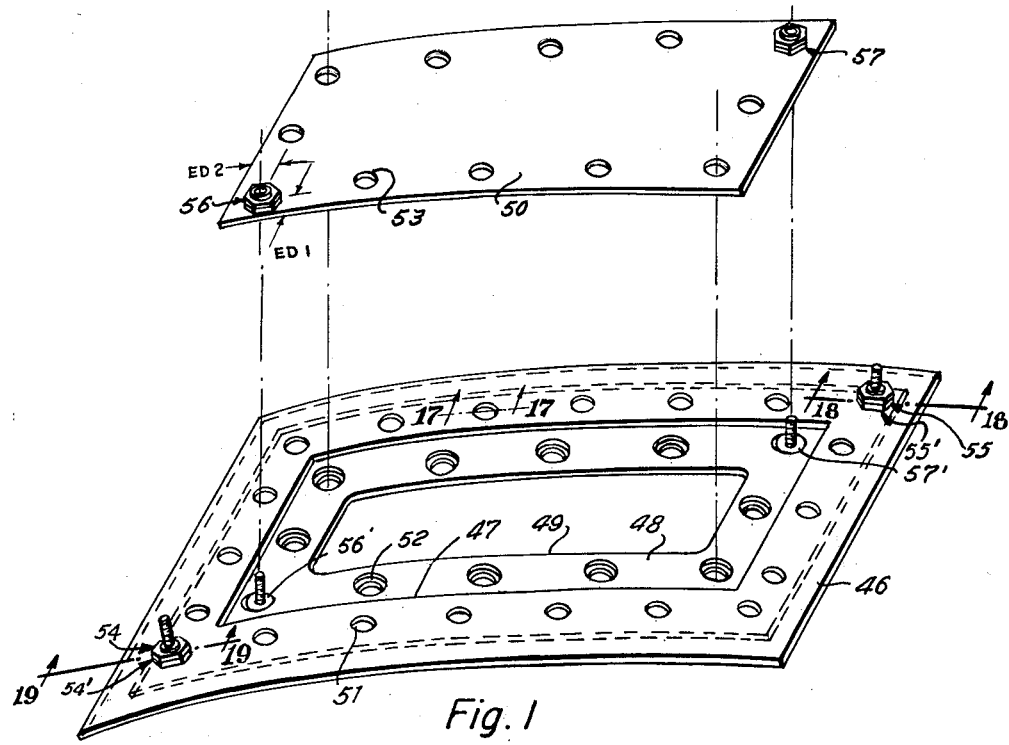

Nov. 24, 1964    J. T. SILER    3,158,045
TOOLING STRUCTURES AND METHODS
Filed Sept. 11, 1961    5 Sheets-Sheet 1

INVENTOR
Joseph T. Siler
BY Ashley & Ashley
ATTORNEYS

Nov. 24, 1964  J. T. SILER  3,158,045
TOOLING STRUCTURES AND METHODS
Filed Sept. 11, 1961  5 Sheets-Sheet 2

INVENTOR
Joseph T. Siler

BY *Ehley & Ehley*

ATTORNEYS

Nov. 24, 1964  J. T. SILER  3,158,045
TOOLING STRUCTURES AND METHODS
Filed Sept. 11, 1961  5 Sheets-Sheet 3

INVENTOR
Joseph T. Siler
BY Ashley & Ashley
ATTORNEYS

INVENTOR
Joseph T. Siler
BY Ashley & Ashley
ATTORNEYS

Nov. 24, 1964 J. T. SILER 3,158,045
TOOLING STRUCTURES AND METHODS
Filed Sept. 11, 1961 5 Sheets-Sheet 5
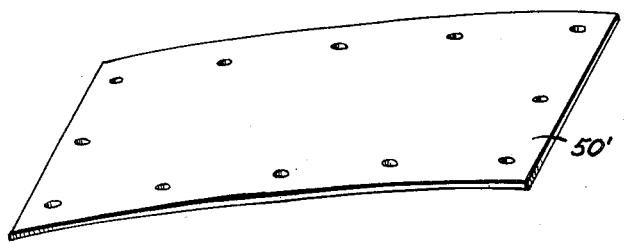
Fig.13
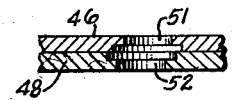
Fig.17
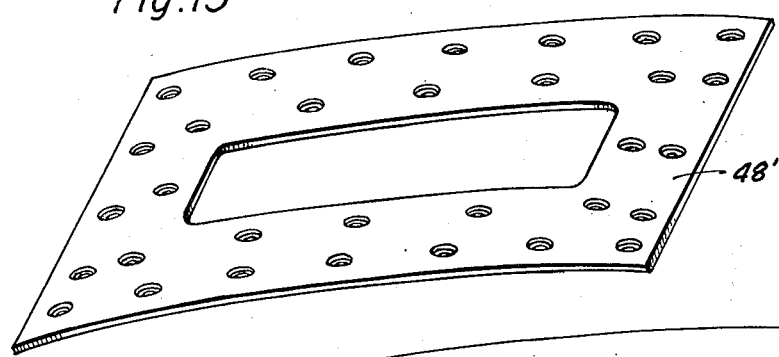
Fig.14
Fig.15
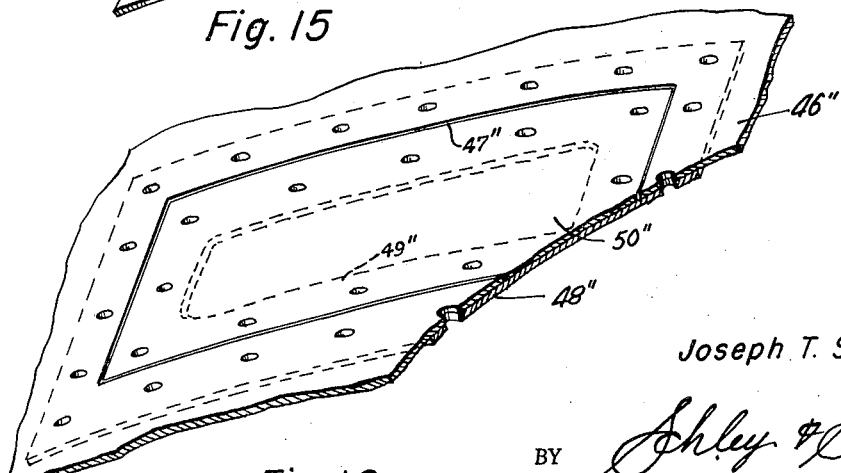
Fig.16
INVENTOR
Joseph T. Siler
BY
ATTORNEYS United States Patent Office 3,158,045
Patented Nov. 24, 1964

3,158,045
TOOLING STRUCTURES AND METHODS
Joseph T. Siler, 205½ E. Louisiana, McKinney, Tex.
Filed Sept. 11, 1961, Ser. No. 137,166
18 Claims. (Cl. 77—62)

This invention relates to new and useful improvements in tooling structures and methods.

In present industry, there is extensive use of various types of tools which function as guides or patterns from which various structural parts and elements may be fabricated in large numbers but with extreme accuracy. It is common to fabricate what is known as a master tool from which may be made additional tools which might be designated as working tools, the master tool forming a permanent record or plan which is carefully protected from damage or wear so as not to impair its accuracy and the working tools being utilized for the actual fabrication operations in which they are subjected to wear and must be replaced for this reason from time to time. This rather elaborate and expensive procedure must be followed in order to ensure the production of various structural parts of complete interchangeability without individual fitting, forming and the like. Necessarily, the tolerances involved are very exacting.

The present invention is directed particularly to fabrication method and means for tools employed in locating apertures in various structural elements which must be joined together by means of bolts, screws, pins, or other types of fastening means, such a working tool being designated usually as a drilling tool. Although the invention is particularly applicable to sheet or plate elements, it is also applicable to other types of structural units, and although it finds particular applicability in the aircraft and missile industries, it is also fully useable and to great advantage in other fabrication operations. Accordingly, without intending or implying any limitation, the invention and the processes thereof will be described largely if not entirely with respect to the formation of tools adapted for use in fabricating plate or sheet structural elements having fastening elements therein in order that undue repetition may be avoided.

Due to the necessary critical tolerances required for structural parts to be completely interchangeable so that they may readily be installed, removed, or replaced without damage, shifting, or misalinement of adjacent parts or structures the fastening receiving openings of doors, access plates, and the like, are drilled or otherwise formed by means of a drilling tool having therein hardened metal inserts which form drill guides and to which the part under fabrication is clamped or otherwise secured so that the fastening receiving openings may be very accurately positioned and drilled. These drilling tools are necessarily subjected to wear and must be replaced from time to time, and the master tool is employed in the same manner as a master gauge. The master tool must be protected from wear and is utilized only for comparison purposes for checking a drilling tool made in accordance therewith. Thus, under previous tooling methods and utilizing previous tooling structures, a drilling tool, for fabrication, requires substantially the same painstaking accuracy and the same very large consumption of man hours of highly skilled labor as would the fabrication of a master tool. Consequently, the cost of tooling, in many instances, is entirely out of proportion to the cost of fabrication of the finished assembly, whether it be an aircraft, missile, or other structure.

In the present invention, methods and means are provided whereby one or two locator openings may be cut in a tool and held to rather close tolerances of accuracy of location, after which the remainder of the fastening openings may be located with only reasonable tolerances, and the ultimate openings adjusted subsequently to very close tolerances. In these procedures and with these structures, components are employed similar to those disclosed in my co-pending application Serial No. 476,469, filed December 20, 1954, now U.S. Patent No. 3,006,443, and reference is made to that patent.

The tooling methods and structures utilize an outer collar having an eccentric bore which receives a cylindrical sleeve also having an eccentric bore, the two parts having a very close but rotatable fit one within the other and including means for affixing the assembly in a sheet or plate in a flush manner, and for locking each part in its properly adjusted or rotated position. Suitable indices are provided for indicating the rotational position of both the collar and the sleeve with respect to a particular index so that from a reading of these indices, the collar and sleeve may be very accurately and precisely positioned to the desired location. With respect to others of the collar and sleeve assemblies, indices are not always required in that they may be properly positioned by a simple alinement process. As a result, quite considerable savings of time and labor may be effected.

It is, therefore, a principal object of this invention to provide improved tooling methods and means, particularly adapted to the forming of master drilling tools and drilling tools in which the drilling guides are located with a minimum of expense but with extreme accuracy.

A further object of the invention is to provide improved methods and means for fabricating tools having therein drilling guides or drilling guide locators in which the guide bore portions of the guides or locators may be selectively positioned after mounting in the tool, and positioned to the exact locations desired.

A further object of the invention is to provide improved methods and means for constructing drilling tools and master drilling tools by means of which such tools may be fabricated for structures in which three or more sheets or plates fay or mate.

Yet another object of the invention is to provide improved methods or means for fabricating drilling tools and master drilling tools which is particularly useful in constructing tools for the fabrication of curved sheets or plates which must accurately fay or mate with one another regardless of whether the sheet involves a compound curve or a simple curve.

Still a further object of the invention is to provide improved methods and means for fabricating drilling tools and master drilling tools in which the angularity of the drill guides or drill guide locators may be adjusted with a high degree of accuracy, this being particularly important in the case of tools for the fabrication of curved sheets with relatively severe curvature.

Yet another object of the invention is to provide improved methods and means for fabricating drilling tools and master drilling tools utilizing a unique accessory for determining the angularity of position of relatively small component parts.

A construction designed to carry out the invention will be hereinafter described, together with other features of the invention.

Figure 2:
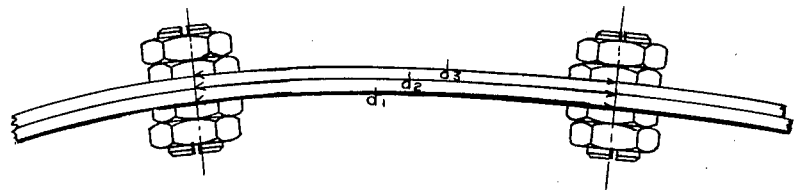
Figure 3:
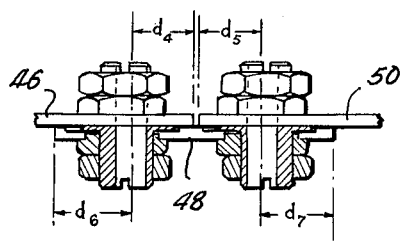
Figure 19:
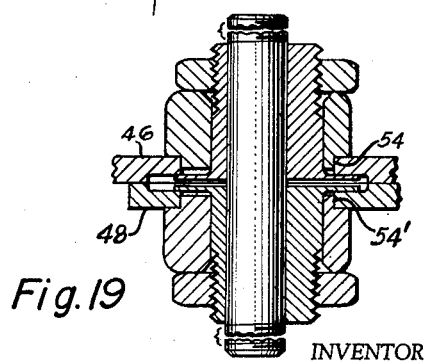
Figure 4:
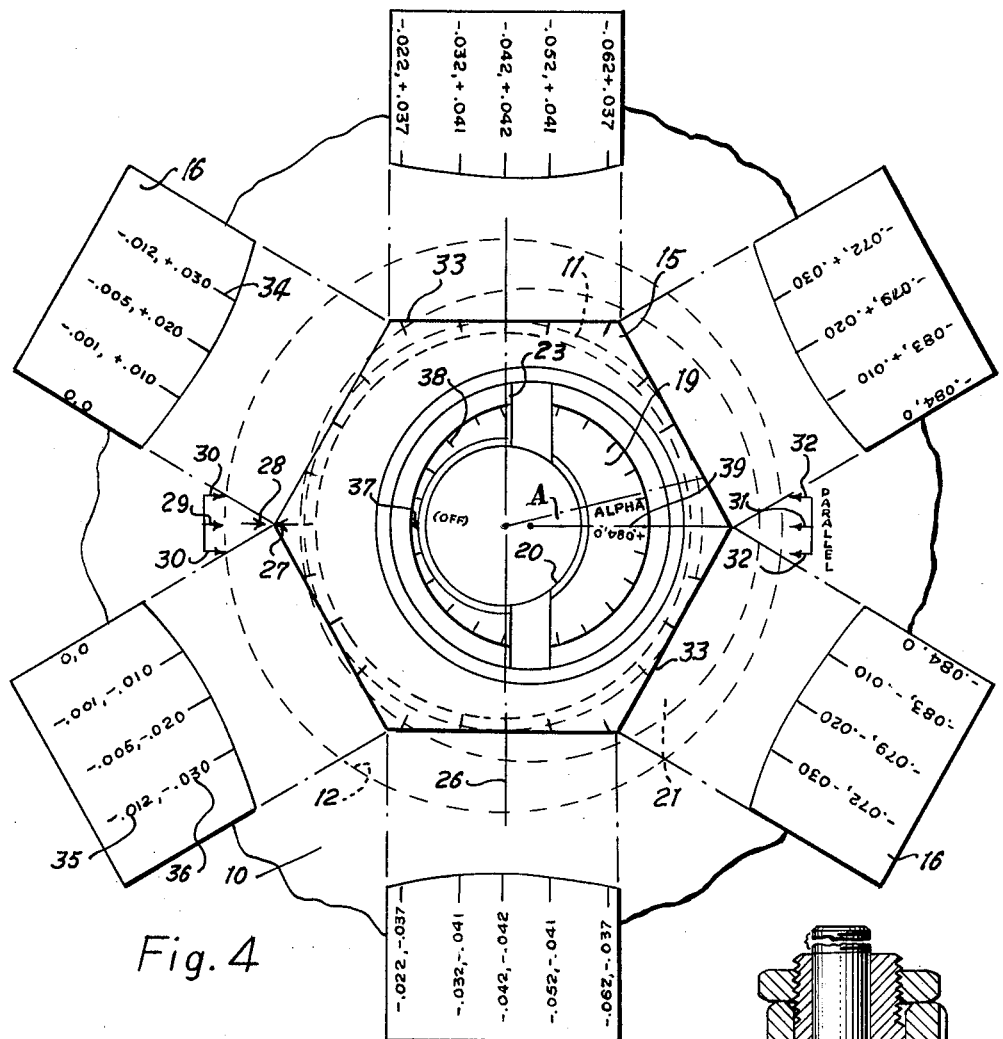
Figure 5:
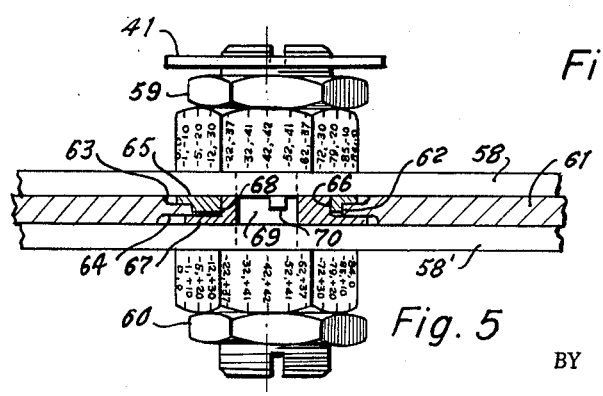
Figure 18:
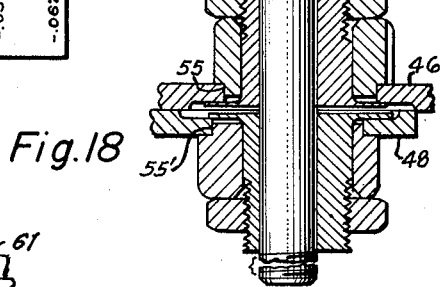
Figure 6:
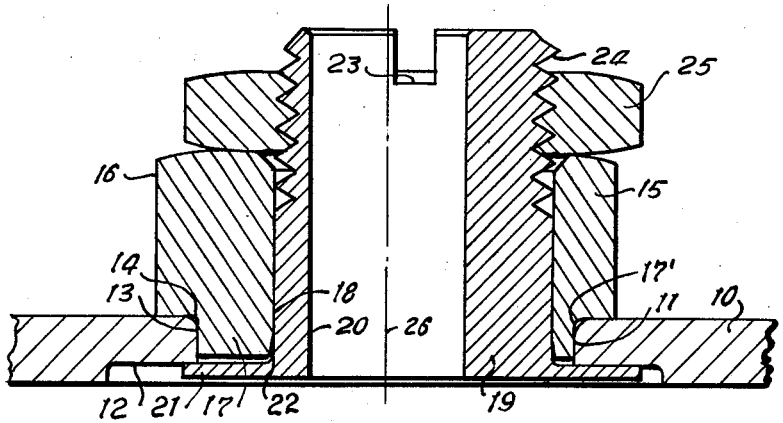
Figure 7:
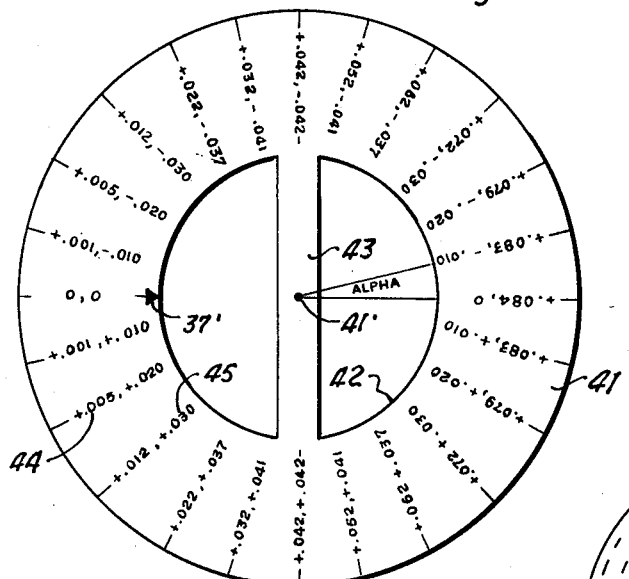
Figure 12:
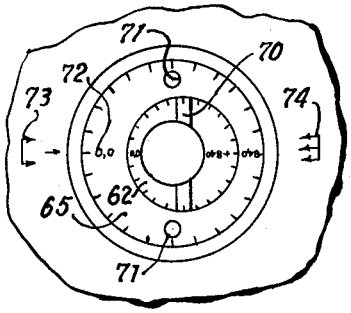
Figure 11:
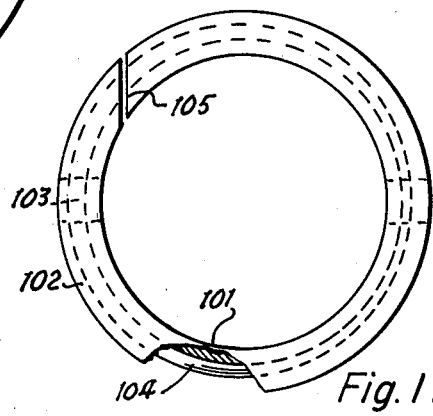
Figure 10:
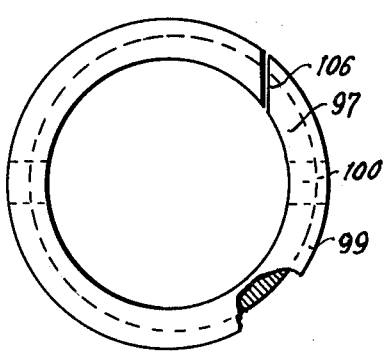
Figure 8:
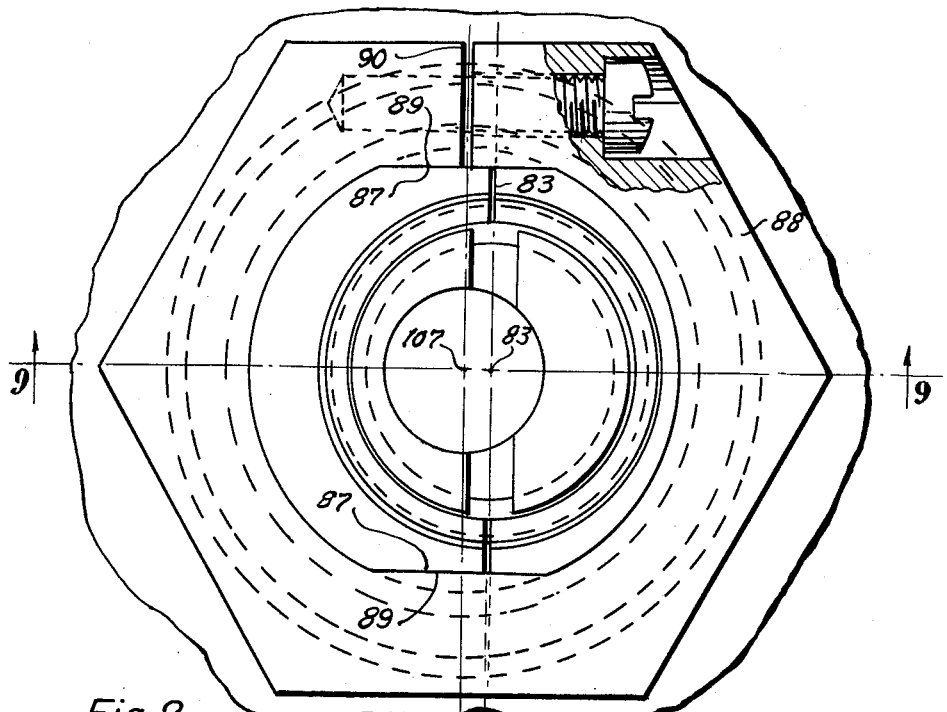
Figure 9:
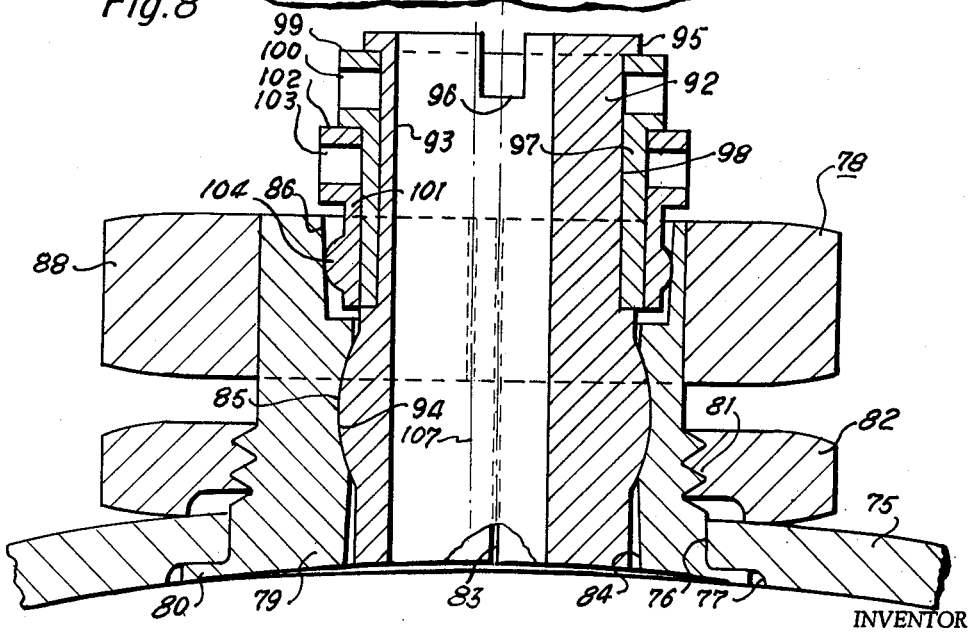

The invention will be more readily understood from a reading of the following specification and by reference to the accompanying drawings, wherein examples of the invention are shown, and wherein:

FIG. 1 is an exploded view in perspective of a master tool assembly constructed in accordance with this invention and adapted to carry out the methods thereof, FIG. 2 is an enlarged, fragmentary, side elevational view of drilling tools illustrating the problems encountered in tooling for curved sheets or plates, FIG. 3 is an enlarged side elevational view, partly in section, illustrating the principle of equal and optimum edge distance utilizing available overlap, FIG. 4 is a combined plan view and orthographic projection of the drill guide locator having indicia thereon, the lock nut being omitted, FIG. 5 is an enlarged side elevational view, partially in section, illustrating a modification of the invention for utilization in instances of three mating plates or sheets, FIG. 6 is an enlarged, vertical, sectional view of the drill guide and drill guide locator, FIG. 7 is an enlarged plan view of the reading accessory, FIG. 8 is an enlarged plan view of a modified form of the drill guide locator having provision for angularity adjustment, parts thereof being omitted, FIG. 9 is a vertical, cross-sectional view of the form of the invention shown in FIG. 8, FIG. 10 is a plan view of the inner angularity adjustment element of the modification shown in FIG. 8, FIG. 11 is a plan view of the outer angularity adjustment element of the latter modification, FIG. 12 is a plan view of the intermediate drilling guide locator shown in FIG. 5, FIG. 13 is a view in perspective of a drilling tool constructed in accordance with this invention, with the tooling bushings omitted, FIG. 14 is a view in perspective of a second drilling tool, FIG. 15 is a view in perspective of a third drilling tool, FIG. 16 is a view in perspective of an assembly of parts made from the drilling tools, FIG. 17 is an enlarged, vertical, cross-sectional view taken on the line 17—17 of FIG. 1, FIG. 18 is a vertical, cross-sectional view taken on the line 18—18 of FIG. 1, and FIG. 19 is a vertical, cross-sectional view taken on the line 19—19 of FIG. 1.

In fabricating sheet or plate elements which are to be joined together by fastening or attaching means such as bolts, screws, rivets and the like, the accuracy of location of the fastening receiving holes or openings is of great importance for several reasons. First, complete interchangeability of parts for rapid initial assembly, repair, or replacement, is of course of paramount importance. Second, optimum uniform equal spacing of corresponding openings in each part in relation to the edges of the part is desirable for uniform or planned distribution of the loading stresses which will be encountered by the parts. Third, uniform spacing or fit of adjoining or abutting parts is highly desirable both from a design viewpoint as well as interchangeability. Fourth, opening alinement of as exact a nature as possible is highly desirable in order that very closely fitting bolts or other fastening means may be utilized for greater structural strength and decreased inelastic structural deflection. The safety factors permitted or utilized in various structures differ in accordance with the nature of the structure and its use, and machining tolerances also vary to some extent. For example, in the aircraft industry, a shop tolerance of ±0.030 inch is generally permissible, whereas in the tooling practices, a tolerance of ±0.002 inch or les is common practice for various locational dimensions. The present invention allows the utilization of considerably greater tolerances in the tooling practice, and in addition, results in production parts of greater accuracy as far as fastening receiving openings are concerned, and hence, a structure in which more closely fitting fastening elements may be utilized to provide greater structural strength, less inelastic structural deflection and more certain interchangeability.

Referring now to FIG. 6 wherein is illustrated an example of the drill guide or drill guide locator which will be generally designated a dual eccentric tooling bushing, the numeral 10 designates a plate or sheet in which the tooling bushing is to be mounted for fabricating a master tool or a drilling tool. An opening 11 is provided in the plate 10 and counterbored in one end to form the counterbore 12. Desirably, the end of the opening 11 opposite the counterbore 12 is bevelled or chamfered slightly as indicated at 13, and the edge of the opening adjacent the chamfer is relieved as indicated at 14. A collar 15 having a hexagonal outer surface 16 is formed with a depending concentric neck 17 having a snug rotating fit within the bore 11, the neck being enlarged slightly at its upper end at 17′ to provide a local interference or locking fit with the chamfer 13 when the collar is tightened into its permanant adjusted position. The collar 15 is formed with a cylindrical eccentric bore 18 receiving a sleeve 19 having a cylindrical eccentric bore 20. An annular, outwardly-extending, concentric flange 21 is provided on the lower end of the sleeve 19 and extends beneath the collar 15 and into the counterbore 12. Again, the lower portion of the bore 18 is chamfered slightly and the lower outer portion of the sleeve 19 immediately above the flange 21 is slightly enlarged to provide a local interference or locking fit between the collar and the sleeve as indicated at 22. The upper end of the sleeve 19 carries diametrically opposed screwdriver notches or slots 23 or other suitable means by which the sleeve 19 may be rotated within the collar 15. The outer upper end of the sleeve 19 also carries screwthreads 24 which receive a concentric screwthreaded locking nut 25.

In the position of the tooling bushing shown in FIG. 6, the collar 15 has been rotated until its bore 18 has been shifted as far as possible to the right, and the sleeve 19 has been revolved until its bore 20 has been shifted as far as possible to the left. In this particular adjustment of the bushing, the center line 26 of the bore 20 thus becomes alined with the center line of the opening 11. At the same time, however, it is readily apparent that by suitable selective adjustment or rotation of the collar 15 and sleeve 19, the center line of the bore 20 may be shifted to any desired point within the opening 11 within a circle having a radius equal to the sum of the eccentricities of the bores 18 and 20 which usually are equal. In the utilization of the tooling bushing, the collar 15 and sleeve 19 are rotatably adjusted until the center line 26 is at the desired point, and the nut 25 is then given a final tightening to lock the parts of the tooling bushing securely in their adjusted positions. At least the sleeve 19 and preferably the entire assembly are made of very hard metal to resist wear.

In FIG. 4 is illustrated the manner in which the measuring indicia is applied to the collar 15 and the sleeve 19. FIG. 4 represents a plan view of the collar and sleeve with the locking nut 25 removed, and the six side faces of the hexagonal outer surface 16 of the collar 15 being orthographically projected. It is understood, of course, that the particular scales and deviations in terms of specific thousandths of an inch will vary in accordance with the size of the tooling bushing and the degree of eccentricity of the collar and the sleeve. In each instance, however, it is desirable if not essential that the eccentricity of the sleeve be equal to the eccentricity of the collar so that the center or axis of the bore 20 may be brought into alinement with the axis or center line of the complete tooling bushing.

The collar 15 is provided with an index marker or pointer 27, and the plate 10 has scribed or otherwise suitably affixed thereon a collar index marker 28 and a sleeve index marker comprising a central pointer or marker 29 flanked by equally spaced and parallel markers 30, spaced a distance above and below marker 29, equal to the bore eccentricity in collar 15, the function of which will be explained hereinafter. Diametrically opposed across the opening 11, the plate 10 carries a parallel sleeve index marker also consisting of a central arrow or pointer 31 and a pair of flanking, equally spaced, parallel pointers or arrows 32. Around the outer periphery of the upper face of the collar 15 are provided a plurality of measuring marks 33 which correspond with aligned index markers 34 extending downwardly on the vertical side faces 16 of the collar. On the vertical side faces, each of the markers 34 is associated with a double scale, the intervals of which, in the present illustration, are designated in specific thousandths of an inch signifying the deviation of the center of the bore 20 from the center of the opening 11. The first given deviation is the abcissa deviation, and the second given deviation is the ordinate deviation. Abscissa signs are (+) to the right of the origin (center of opening 11) and (−) to the left. Ordinate signs are (+) above and (−) below the origin. These conventions conform to those generally accepted for the rectangular coordinate and quadrant systems of analytical geometry and trigonometry. The first given or abscissa scale 35, as shown on collar 15, proceeds from zero pointer 27 clockwise to minus 0.084 at the diametrically opposed outer point on the outer surface of the collar 15, and proceeds counterclockwise in the opposite direction around the outer surface of the collar 15, again, from zero pointer 27 to minus 0.084. Thus, if the collar 15 were rotated 90° counterclockwise, the index marker 28 would indicate a deviation or abscissa of minus 0.042, in this case, inch. The second given or ordinate scale 36, as shown on collar 15, proceeds clockwise from the zero pointer 27 to plus 0.042 inch 90° from zero pointer 27 and then from plus 0.042 inch again to zero 180 degrees from zero pointer 27. The scale proceeds counterclockwise in the opposite direction from the zero pointer 27 to minus 0.042 inch 90° from zero pointer 27 and then back again to zero 180 degrees from zero pointer 27. It is to be noted that FIGS. 4 and 6 are five times actual size. It is also to be noted that the pointer 27 on the upper surface of the collar 15 is diametrically opposite the direction of eccentrical displacement of the center or axis of the bore 18.

The sleeve 19 is provided with an index mark or pointer 37 on its periphery alined with the plane of displacement defined by the axis of the bore 20 and by the axis of the sleeve 19 and lying on the same side from the axis of the sleeve itself as the eccentric bore 20. The sleeve also carries on its upper end spaced peripheral index marks 38, one of which 39 is marked +0.084, 0 and is diametrically opposite the pointer 37.

In the illustration of FIG. 4, and designating the vertical axis as the Y-axis or ordinate and the horizontal axis as the X-axis or abscissa, the first portion of the displacement reading may be taken directly from the outer surface 16 of the collar 15 and in the illustration will be zero at the collar index pointer 28.

The reading of the sleeve 19 is taken by reading the scale around the periphery of sleeve 19 on the side adjacent to the sleeve index markings 29 and 30 on plate 10. Practically speaking it will usually be necessary to utilize a reading accessory 41 as shown in FIG. 7. This reading accessory is shown in place in FIG. 5. In many instances, the upper end of the sleeve 19 will be too small for the indicia or scales to be legibly displayed thereon, and for this purpose, the accessory fitting 41 is provided. The accessory fitting 41 is comprised of a circular disk of hard metal of a diameter no greater than the distance between the index pointers 29 and 30 and the parallel pointers 31 and 32, and is provided with a central opening 42 of such diameter as to have a snug sliding fit over the upper end of the sleeve 19, the central opening 42 being traversed by a diametrically disposed bar 43 of such width as to have a snug sliding fit in the notches or slots 23 and carrying a center marker 41'. The accessory disk is easily placed over the upper end of the sleeve 19 with the bar 43 in the slots 23 and the 0, 0 portion of the scales and the index mark 37' alined with the index mark 37 on the sleeve. The portion of the accessory disk 41 between its outer periphery and the central opening 42 is provided with an outer abscissa scale 44 identical to the scale 35 except that the signs are reversed, and an inner ordinate scale 45 identical to the scale 36, again with the signs reversed. This reading accessory serves to locate the axis of collar bore 18, and to provide readily readable scale markings. The deviation reading of sleeve 19 is now accomplished by passing a straight edge through the axis of collar bore 18, designated as 41', and holding the edge parallel to the pointing arrows 30 and 32 located on either side of the tooling bushing. This again gives a reading of 0, 0 so that the total displacement of the bore 20 is zero. Now if the sleeve 19 is revolved 90° clockwise, the reading from the collar 15 will still be zero, and the reading from the sleeve should be +0.042, +0.042. Again passing the straight edge through the axis of the bore of collar 15 and holding the edge parallel to the pointing arrows 30 and 32 it is found that the edge does in fact pass through the mid-position of the index 29 and the mid-position of the parallel pointer 31, and that the reading on accessory 41 is +0.042, +0.042.

If now, however, after sleeve 19 has been revolved 90° clockwise, it should be held in place in relation to plate 10, and collar 15 is revolved 90° counterclockwise, the reading on collar 15 taken at the collar index pointer will be −0.042, +0.042. The edge of the straight edge passed through axis 41' of bores 18 and held parallel to sleeve index mark 30 and parallel mark 32 will now pass through these points. The reading adjacent to the straight edge on reading accessory 41 will again be +0.042, +0.042. An algebraic summation of abscissae and ordinates yields a composite deviation reading of 0, +0.084 for the axis of bore 20 in relation to the axis of bore 11 in plate 10.

It may now be seen that once collar 15 has been rotated from zero that it is necessary that the straight edge be shifted up and down in parallelism with pointers 30 and 32 in order to follow the axis of bore 18 and read the scale of sleeve 19, the reading accessory 41, properly.

The outer or abscissa scales 35 and 44 of the collar 15 and disk 41, and the inner or ordinate scales 36 and 45 of the collar and disk are based upon the Cartesian system of coordinates and provide a means for direct reading of the true location of the bore 20 of the sleeve 19. Since the index marking 28 represents the negative X-axis in this system, counterclockwise rotation of the sleeve 19 from a zero position produces an increased abscissa reading since the center of the bore 20 is being moved in the plus X direction. Clockwise rotation of the sleeve 19 also gives an increased abscissa reading, and consequently, all of the scale markings on the abscissa scale 44 of the disk 41 are positive. Further, as the sleeve 19 is rotated clockwise, the ordinate reading is becoming positive, and hence, the indicia in the portion of the ordinate scale 45 below the center of the disk 41 are positive, whereas counterclockwise rotation of the sleeve 19 toward negative ordinate readings requires that the portion of the scale 45 above the center of the disk 41 carry negative indicia.

The rotation of the 0, 0 point of the outer collar 15 in either direction while holding sleeve 19 fixed against rotation moves the bore 20 of the sleeve 19 in the minus X direction and accordingly produces a decreased abscissa reading. For this reason, all of the indicia or graduations of the outer or abscissa scale 35 of the collar 15 carry a negative sign. Rotation of the collar 15 in a counterclockwise direction while holding sleeve 19 fixed against rotation shifts the center of the bore 20 upwardly for the first ninety degrees of rotation, and hence, the portion of the ordinate scale 36 above the center of the bushing is positive and increases for 90 degrees, and is then positive and decreases for the next 90 degrees. Similarly, the portion of the ordinate scale below the center of the bushing, which would be read if the bushing were rotated clockwise while holding sleeve 19 fixed against rotation, is negative in sign and increases in a negative direction for 90 degrees, then decreases for 90 degrees to zero.

In the particular example shown, the specific indicia marks and measurement indications were based on an eccentricity of 0.042 inch and the formulae For the collar, Abscissa=—(1+cos alpha) times eccentricity
Ordinate=sin alpha times eccentricity.

For the sleeve and reading disk,

Abscissa=(1+cos alpha) times eccentricity
Ordinate=—sin alpha times eccentricity.

Utilizing these formulae suitable angles were selected, as indicated at A in FIG. 4 in order to provide reasonably evenly spaced scale graduations of such quantities or co-ordinate indications in thousandths of an inch as to facilitate interpolation between adjacent ones of the indicia. Of course, any suitable or desirable spacing and specific dimensions in thousandths of an inch may be employed.

In describing the use of the tooling bushings, the master tools will be described with a reference numeral, the corresponding drilling tools will be described with the same numeral with a prime added thereto, and the corresponding production parts will be described with the same numeral with a double prime added thereto.

An example of the use of the tooling bushings and the methods of their utilization are illustrated in FIGS. 1 and 13–16. In the structure employed as an example, there is a first curved plate member 46″ which might be a portion of the outer sheathing or skin of an aircraft or missile and which has therein an access opening 47″. A backup member or flange member 48″ engages the underside of the plate 46″, extending marginally beyond the edges of the opening 47″ and is provided with an opening 49″ smaller than the opening 47″. The closure member of plate 50″ is also curved, as is the member 48″, and is adapted to fit snugly within the opening 47″ with ample but only ample marginal and peripheral clearance for installation and removal. Assuming that master tools are to be fabricated for these three parts, the parts themselves, less fastener apertures, may be used as a starting point, or in such cases that the parts may not be of sufficient thickness to accommodate the counterbores 12, or may not be sufficiently rigid, somewhat thicker plates, curved to match the parts exactly, may be employed. The usual and conventional layout procedures are employed to mark the location of the various fastener holes 51 in master tool 46, 52 in master tool 48 and 53 in master tool 50. In locating these fastener holes, due regard is given to minimum fastener edge distance, prevention of tolerance build-up, and proper spacing of the holes, but only relatively large and standard shop tolerances are required in locating the holes. In many instances, however, it is desirable that one or two of the fastening holes in each master tool, such as the diagonally disposed holes indicated at 54 and 55 in master tool 46, 54′ and 55′ and also 56′ and 57′ in master tool 48 and 56 and 57 in master tool 50, be more accurately located with relatively close tolerances. The holes should be sized as accurately as possible so as to receive the necks 17 of the collars 15 of the tooling bushings in a very close but rotatable fit, and are then counterbored upon the side of the master tool or plate which is to fay or mate with the opposing face of another master tool. Following this, tooling bushings are installed in all of the openings, or, if desired, only in the openings 54, 54′, 55, 55′, 56 and 56′, 57 and 57′, which will be designated as "locator openings." The index marks 28, 29, 30, 31 and 32 will have been scribed or otherwise marked (all the index marks being alined and facing in the same direction for obvious purposes of uniformity) on both the master tools adjacent the locator openings or holes, and the tooling bushings will be installed in the locator holes in their 0, 0 positions. There are many ways in which the optimum position relationship between the several parts may be obtained involving many variable factors, some of which will be discussed.

As one method, the several locator holes may be very accurately positioned as previously discussed with close tolerances being held on the location of the locator holes in relation to the edges of each master tool as indicated at ED1 and ED2 in master tool 50. Master tools 46 and 48 may then be mated and joined by a closely fitting pin or bolt extending through the tooling bushing at locator hole 54 of master tool 46 and the corresponding tooling bushing in locator hole 54′ in master tool 48. Master tools 46 and 48 are then adjusted so that their longitudinal edges are as nearly parallel as possible and/or so that the tooling bushings in locator hole 55 and the corresponding tooling bushing in locator hole 55′ of master tool 48 are as nearly as possible in register, the bushings as yet being undisturbed from their initial 0, 0 setting. As soon as it has been determined in this manner or any other suitable manner that the master tools are as nearly alined as possible, they are clamped together. Now the tooling bushing in locator hole 55 is adjusted. Both the inner sleeve and the outer collar are revolved as necessary by use of a wrench and screw driver until a tightly fitting dowel pin or bolt will pass through the bores 20. The tooling bushing in the corresponding locator hole 55′ in master tool 48 is not disturbed from its 0, 0 concentric setting at this time.

By use of the index marks 28, 29 and 30 and the parallel marks 31 and 32, the deviation abscissa and ordinate are read from the tooling bushing in locator hole 55, the two abscissa readings from the collar and sleeve of the tooling bushing are added algebraically, and the two ordinate readings are added algebraically. Both the abscissa total and the ordinate total are then divided by four. This is done because one-quarter of the tooling bushing adjustment will be borne at each of two locator holes in master tool 46, and one-quarter of the adjustment or deviation will be compensated for in each of two locator holes of master tool 48. The coordinate readings thus obtained are then set into each of the four tooling bushings, the tooling bushing at locator hole 55 being adjusted to the abscissa and ordinate readings as obtained, and the tooling bushing at locator hole 54 being adjusted to the same coordinate settings but with opposite signs. The tooling bushing in locator hole 54′ in master tool 48 is adjusted to the same coordinates but with the sign of the ordinate changed, and the tooling bushing in locator hole 55′ in master tool 48 is adjusted to the same readings but with the sign of the abscissa changed. This arrangement takes into consideration the fact that since the tooling bushings in master tool 48 are read from the opposite side of the plate from which they are read in master tool 46, Cartesian quadrant I and quadrant IV interchange places as do quadrants II and III. This simply changes the sign of the ordinate from what it would have been if the tooling bushings in both master tools could be adjusted from the same side.

The coordinate readings or corrections may be set into the four tooling bushings by a trial and error method since the operator will have before him the coordinate as plus and/or minus abscissa and ordinate figures, and hence will known the approximate position of the proper location for the center of the bores 20 of the sleeves 19. As an alternate, and preferably as a training aid in the use of the tooling bushings, a computer (not illustrated) may be utilized for determining the proper settings of the tooling bushing collars and sleeves. Such a computer is desirably made of transparent plastic or some similar suitable material and would constitute a back plate having mounted thereon for rotatable movement thin plastic facsimiles of the tooling bushing collar and tooling bushing sleeve carrying the same abscissa and ordinate scales as the tooling bushings themselves. A suitable coordinate grid may be inscribed upon the back plate, and knowing from the previously described abscissa and ordinate desired to be set into each tooling bushing, the operator may revolve the collar and sleeve facsimiles to shift the center of the bore 20 represented upon the computer into the desired coordinate location upon the grid by mere visual observation. The desired settings may then be read directly from the computer and set into the several tooling bushings.

The master tools 46 and 48 will now mate together at their locator holes after the clamps holding them in alinement have been loosened, and all of the edge distances, that is the distance from the center of the tooling bushing bore to the edge of the master tool in both the ordinate and abscissa directions, will be equal. Note that the locator holes had equal edge distance and were held to close tolerances originally. If a minute adjustment is necessary to mate the second pair of tooling bushings at 55 and 55' after the bushings at 54 and 54' have been pinned, the master tools should be reclamped together before this adjustment is made.

Now, the same procedure may be employed to mate the master tool 50 properly with the master tool 48 through utilization of the locator holes 56, 56' and 57, 57', following which tooling bushings are installed in all openings 51, all openings 52 and all openings 53, and adjusted suitably until all of the bushings properly mate. This will be with the master tools held clamped together, of course, by bolting or pinning the tooling bushings in the locator holes. Care should be taken that these secondary tooling bushings in the fastening holes are adjusted equally to one half of the part overlap so as to maintain equal and optimum edge distances on each of the mating tools. (See FIG. 3.) When the master tool 50 is fitted within the opening 47, correct clearance between the edges of the tool 50 and the opening may be ensured by usual inspection methods and tools, and if a small amount of adjustment is desirable, that adjustment may be made by unpinning one of the pairs of tooling bushings in one of the locator hole locations and judiciously adjusting the tooling bushings at the other locator hole. A final check should be made of all edge distances and alinements and then the locking nuts 25 securely tightened.

The next step is to scribe closely around the outer edge of the master tool 50 on the surface of master tool 48 and to scribe closely around the marginal opening 47 on the surface of master tool 48. Then the workman scribes closely around the edge of the opening 49 upon the master tool 50 and around the outer periphery of master tool 48 on the underside of master tool 46. These scribe marks provide a lasting record of the positional relationship of the original parts, their original dimensions, and make possible an exact duplication of the master tool in the drilling tools. As is usual in tooling practice, the scribe marks may be supplemented by stops or other tooling devices. Master tools for the three parts 46", 48" and 50" are now complete.

To construct a drilling tool for drilling the inner periphery of fastening openings in the flange member 48", closure 50" (undrilled) must be employed as the body of the drilling tool or a plate formed to the faying surface curvature of closure 50". This is true because with contoured parts, the mating faying surface of the tool must match the mating faying surface of the part to be drilled. This is illustrated in FIG. 2 in which it is to be noted that the distances $d_1$, $d_2$ and $d_3$ are not equal. Since the dimension $d_1$ is less than the dimension $d_2$, the utilization of a duplicate of master tool 50, rather than a duplicate of master tool 48, is required for drilling part 48". Accordingly, master tool 48 is employed to locate the holes in the body of drilling tool 50' in order to construct drilling tool 50' for drilling flange member 48".

Accordingly, a plate corresponding in size and curvature to the master tool 50 is drilled and counterbored according to engineering specifications, but such drilling need only be to relatively large shop tolerances. Tooling bushings are now installed in all the holes and the part is clamped into place within the scribe marks on the master tool 48. The tooling bushings in the drilling tool 50' are now adjusted to exact alinement with the tooling bushings in the master tool 48, the latter bushings not being disturbed. The surface of the drilling tool 50' is then scribed around the periphery of the opening 49, and stops or other indexing devices may be added to the drilling tool which is now ready to be used for drilling very accurately located holes in production parts, flange plate 48", for use in the final structures being manufactured.

To construct a tool for drilling the outer row of fastening openings in production parts 48", a drilling tool plate 46' is formed to the exact contour of the surface marked $d_2$ in FIG. 2 and an inner cutout 47' formed therein held to rather close tolerances in relation to the scribed line corresponding to that cutout on master tool 48, the necessary holes are drilled and counterbored with tooling bushings being positioned in each. The drilling tool 46' is now clamped in alinement with the outer scribe marks on master tool 48 and the tooling bushings of the drilling tool 46' adjustably alined with the bushings in master tool 48 which are not disturbed.

The remaining drilling tools are fabricated following the same procedures.

The tooling bushings employed in the drilling tools may be as shown in FIGS. 2 and 3 and may not carry the deviation indicating indicia. They are, however, like the bushing shown in FIGS. 4 and 6, formed of very hard metal so as to be highly resistant to wear, and the bores of their sleeves should be very accurately dimensioned so as to have a very close fit with the drill which is to be passed therethrough when drilling production parts in accordance with the usual employment of drilling tools.

In FIG. 3 of the drawings there is illustrated the principle of equal and optimum edge distances. The figure shows the master tools 46, 48 and 50, or corresponding drilling tools, and demonstrates pictorially the importance of adjusting the tooling bushings in tools 46 and 48 to space the bores of the bushings equally from the edges of the tools or cause dimension $d_4$ to equal dimension $d_6$. Similarly, the tooling bushings in tools 48 and 50 should be adjusted to cause dimension $d_5$ to equal as nearly as possible dimension $d_7$. Thus, the available edge distance is equally divided between the tools.

The invention may also be utilized in the case of three overlapping plates or sheets by means of the tooling bushing illustrated in FIGS. 5 and 12. For the outer plates 58 and 58', tooling bushings 59 and 60, substantially identical to those shown in FIGS. 4 and 6 and previously described, are employed but a modified form of the tooling bushing must be utilized in the center plate 61. The plate 61 is drilled with an opening 62 and counterbored on both sides to form an upper counterbore 63 and a lower counterbore 64. A flanged outer collar 65 is received in the opening 62 and counterbore 63 and provided with an eccentric bore 66. A flanged internal sleeve 67 is provided with an upstanding neck 68 having a snug rotating fit in the bore 66 and carrying an eccentric bore 69. Slots or notches 70 are provided in the upper end of the neck 68 so that the sleeve 67 may be turned with a screwdriver or similar tool, and the collar 65 is provided with a pair of spanner recesses 71 in its upper surface so that it also may be revolved through use of a conventional spanner tool. It is to be noted that the combined thickness of the tooling bushing for the center plate is equal to the thickness of the plate so that flush upper and lower surfaces are provided. Abscissa and ordinate scales or indices 72 are scribed or otherwise marked on the upper surfaces or ends of the collar 65 and sleeve 67, and index and parallel pointers 73 and 74 are scribed on the upper surface of the plate 61 as shown in FIG. 12.

In order to retain the double flush dual eccentric tooling bushing as shown in FIG. 5 it is necessary to enlarge the neck 68 locally near the lower flange, and to enlarge the neck of the outer collar near the upper flange so that when outer collar 65 and internal sleeve 67 are pressed into final position a locking fit results. An alternative to this procedure is to pour plastic tooling material into the counterbore cavities after adjustment, and allow to harden fixing the position of collar 65 and sleeve 67. In this case it would be desirable to chamfer the outer flanges of both collar 65 and sleeve 67 slightly to aid in retention.

When using the triple tooling bushing method and holding close tolerances on two locator holes in each part in relation to the edges of the part, similarly to the method previously described for two parts, the following points of procedure should be followed: (1) Pin together the first and second master tools at the first locator point and read the total deviation at the second locator point as previously described. (2) Retaining this position of the measuring locator at the second locator point by pinning, then measure the total deviation between the second and third master tools by pinning the third master tool to the first and second master tools at the first locator point and reading the total deviation between the second and third master tools at the second locator point. The total deviation of all three master tools is now the algebraic summation of the total deviation of each set of two master tools. (3) Divide the algebraic summation of deviation of all three master tools by six and proceed as previously described. The sign convention for applying the deviation to collar 65 and sleeve 67 is the same as that used for the upper tool in the original example.

It is to be noted that the tooling methods may be carried out utilizing only one locator hole if the parts are sufficiently contoured as to lock themselves together with only one pair of tooling bushings in place. Although less desirable in instances than the two locator hole procedure, the one locator hole method may also be used for flat elements by alining the two elements by their edges, scribe marks or other means. In both procedures one tooling bushing remains at its 0, 0 setting and the other adjusted for alinement of the drill receiving bores of the tooling bushings, after which the observed abscissa and ordinate deviation is divided by two and set into each of the two bushings. It is also pointed out that the locator holes may be accurately positioned upon the basis of edge distance, on the basis of the distance between the centers of the locator holes or by utilizing both processes. In addition, in alining the tooling bushings in the secondary fastening holes, it is desirable to employ tooling bushings having abscissa and ordinate indicia thereon for the purpose of more accurately judging and obtaining equal edge distances throughout the entire part.

It is sometimes desirable to be able not only to adjust the position of the drill guide opening in the tooling bushing, but also to be able to adjust its angularity. This is particularly true in the case of fastening receiving openings in members having relatively large degrees of curvature. A structure for achieving this desirable result is illustrated in FIGS. 8 through 11. In this structure, the curved plate 75 is provided with an opening 76 having a counterbore 77 for receiving the tooling bushing designated generally by the numeral 78. A collar 79 has an annular outwardly extending flange 80 on its lower end for reception in the counterbore 77, the collar being externally screwthreaded at 81 a short distance above the flange 80 for reception of a suitable lock nut 82. The collar is longitudinally split as shown at 83 and has an eccentric, longitudinal bore 84 provided with a semi-spherical socket 85 in its intermediate portion, the upper end of the bore 84 having a tapered counterbore 86. The outer wall of the collar 79 is flattened at diametrically opposed points to form flat longitudinal faces 87, and a hexagonal clamping ring 88 having mating, internal, flat faces 89 is received upon the upper end of the collar 79. The clamping ring 88 is also split at one side as shown at 90 and carries a clamping bolt 89, the tightening of which securely clamps the split collar 79, and, as will appear more fully hereinafter, simultaneously clamps into position the parts carried internally of the collar.

An inner sleeve 92 having an eccentric bore 93 is provided with a semi-spherical ball section 94 in its lower end, the ball section 94 being received in the socket 85 in snug, sliding relationship so that the sleeve is capable of undergoing a tilting movement in the bore 84. The upper end of the sleeve carries an external flange 95 and a pair of notches 96 for receiving a screwdriver or other tool, the flange 95 confining upon the upper end of the sleeve 92 a first tilting collar 97 having an eccentric bore 98. The upper end of the first collar 97 carries an external flange 99 having therein spanner openings 100 and confined upon the lower end of the first collar 97 is a second tilting collar 101 also having a flange 102 at its upper end abutting the underside of the flange 99, the flange 102 also carrying spanner openings 103. An eccentric rib 104 of substantially semi-circular vertical cross-section integrally encircles the lower end of the second tilting collar 101 and has a snug fit with the wall of the tapered counterbore 86. The outer face of the rib 104 is circular but is eccentrically positioned with respect to the longitudinal axis of the collar 101 so that rotation of the second tilting collar 101 within the counterbore 86 will cause a tilting movement of the first tilting collar 97 and the sleeve 92 within the socket 85. The first tilting collar 97 and the second tilting collar 101 are split, as indicated at 105 and 106, respectively, not only so that they may be slipped onto the sleeve 92 by spreading and forcing over the ball section 94, but also so that they may be inwardly compressed or distorted into clamping position around the upper end of the sleeve 92. Spring action is also present in the tilting collars, providing slight friction against turning when not clamped.

This additional form of the tooling bushing carries suitable abscissa and ordinate indicating indicia as the previously described tooling bushings, and for this purpose, FIG. 4 may be taken as a representation of the hexagonal clamping member 78.

In the utilization of this latter form of the invention, the collar 79 and sleeve 92 are adjusted to the desired position as previously described, after which the lock nut 82 is securely tightened to lock the collar in position. Then, by suitable rotation of the first and second tilting collars 97 and 101, utilizing the spanner openings 100 and 103, the sleeve 92 is tilted to the desired degree, after which the bolt 91 is securely tightened, flexing the clamping ring member 88 inwardly which squeezes together the split collar 79 and flexes the collars 97 and 101 inwardly into tight, binding and locked relationship with the sleeve 92. The double eccentricity of the collars 97 and 101 provides, of course, for any desired degree of tilting in any direction without disturbing the previously adjusted position of the axis 107 of the bore 93 of the sleeve 92, collars 97 and 101 having equal eccentricity.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A tooling bushing including, a collar having a depending circular neck and a longitudinal bore eccentric of the neck, a circular sleeve received for rotation in the longitudinal bore and having an eccentric bore, an external flange on that end of the sleeve toward which the collar neck depends, a locking nut on the end of the sleeve opposite the flange, and indicia on the collar and sleeve for indicating their rotational positions.

2. A tooling bushing for flush mounting in a plate having therein a circular opening and a counterbore in one end of the opening, said bushing including, a collar having a depending circular neck for reception for rotation in the opening and a longitudinal bore eccentric of the neck, a circular sleeve received for rotation in the longitudinal bore and having an eccentric bore for receiving a drill, an external flange on one end of the sleeve for flush reception in the counterbore, a locking nut on the end of the sleeve opposite the flange for clamping the flange in the counterbore and the neck in the opening of the plate and means on the collar and on the sleeve for rotating the collar and the sleeve individually, said rotating means on the collar and on the sleeve being disposed for access on the same side of the plate as the locking nut and opposite that side of the plate in which the counterbore is disposed.

3. A drilling tool including a plate having a circular opening therein and a counterbore in one end of the opening, a collar having a depending circular neck having a snug rotating fit in the opening and a longitudinal bore eccentric of the neck, a cylindrical sleeve having a snug rotating fit in the longitudinal bore and having a longitudinal eccentric bore for receiving a drill, an external flange on one end of the sleeve having a flush rotative fit in the counterbore, means on the collar for receiving a tool externally for rotation of the collar in the opening, means on the sleeve for receiving a tool externally for rotation of the sleeve in the longitudinal bore of the collar, said means on the collar and on the sleeve for receiving a tool being disposed on the same side of the plate opposite that side of the plate in which the counterbore is disposed, a locking nut on the end of the sleeve opposite the flange for clamping the flange in the counterbore and the neck in the opening, an index indicator on the plate adjacent the collar, and indicia on the collar and the sleeve for indicating their rotational positions with respect to the index indicator.

4. A tooling bushing including a collar having an external flange on its lower end and an eccentric bore with a semi-spherical socket formed therein, a locking nut on the collar, a clamping ring on the upper end of the collar, the eccentric bore of the collar having a counterbore at its upper end, a sleeve of circular cross-section having an eccentric cylindrical bore, the sleeve having a semi-spherical ball section thereon for reception in the semi-cylindrical socket whereby the sleeve may undergo tilting movement in the eccentric bore of the collar, a first tilting collar confined on the upper end of the sleeve and having an eccentric bore receiving the upper end of the sleeve with snug rotative fit, and a second tilting collar having a longitudinal bore having a snug rotative fit with the exterior of the first tilting collar, the second tilting collar having an eccentric rib encircling its lower end and having a snug rotative fit within the counterbore of the eccentric bore of the collar.

5. A tooling bushing as set forth in claim 4 and means on the collar, the sleeve, the first tilting collar and the second tilting collar for external reception of a tool for seperate and independent rotation of said elements.

6. A tooling bushing for flush reception in both sides of a plate including, a collar having an eccentric bore and a depending circular neck, a sleeve rotatively received in the eccentric bore of the collar and having an eccentric bore for receiving a drill, an external flange on the lower end of the sleeve adjoining the lower end of the collar neck, and means on the collar and the sleeve accessible from the same side of the plate for external reception of a tool for separate and independent rotation of the collar and the sleeve.

7. A drilling tool including a plate having therein a circular opening with counterbores at each end, a collar having an external flange on its upper end for reception in one counterbore and a depending circular neck having a snug rotative fit in the plate opening, the collar having an eccentric circular bore, a sleeve having an upstanding circular neck having a snug rotative fit in the eccentric bore of the collar, the sleeve having a circular eccentric bore for reception of a drill and an external flange on its lower end for reception in the opposite counterbore, the combined axial thicknesses of the collar and sleeve being no greater than the thickness of the plate, and means on the collar and the sleeve for external reception of a tool for separate and independent rotation of the collar and the sleeve.

8. A drilling tool as set forth in claim 7 wherein the plate carries an index indicator adjacent the opening, and the collar and the sleeve carry indicia for indicating their rotational positions with respect to the index indicator.

9. A drilling tool as set forth in claim 7 wherein the plate carries an index indicator adjacent the opening, and the collar and the sleeve carry indicia for indicating the coordinates of displacement of the axis of the eccentric bore of the sleeve with respect to the axis of the plate opening in thousandths of an inch.

10. The method of fabricating a tool having therein openings corresponding to fastening receiving openings in a plate including the steps of forming in the tool openings corresponding to the openings of the plate, using at least one opening in the tool and the corresponding opening in the plate as locator openings, positioning in the selected locator openings adjustable tooling bushings having a drill receiving bore infinitely adjustable over a given area, alining the axis of the drill receiving bore of at least one tooling bushing concentrically with the locator opening in which it is positioned, alining the tool with the plate, adjusting the second tooling bushing to aline the axis of its drill receiving bore with the axis of the drill receiving bore of the first tooling bushing, measuring the eccentricity of the axis of the drill receiving bore of the second tooling bushing with respect to the axis of the locator opening in which it is positioned, and adjusting all the tooling bushings to divide the eccentricity equally therebetween.

11. The method of fabricating a tool having therein openings corresponding to fastening receiving openings in a plate including the steps of, forming in the tool openings corresponding to the openings of the plate, using a pair of openings in the tool and the corresponding pair of openings in the plate as locator openings, positioning in the selected locator openings adjustable tooling bushings having a drill receiving bore infinitely adjustable over a given area, alining the axes of the drill receiving bores of one bushing in the plate and the corresponding bushing in the tool concentrically with the locator openings in which said bushings are positioned, alining the axis of the drill receiving bore of one of the second pair of tooling bushings concentrically with the locator opening in which it is positioned, alining the tool with the plate, adjusting the other of the second pair of tooling bushings to aline the axis of its drill receiving bore with the axis of the drill receiving bore of the first of said second pair of tooling bushings, measuring the eccentricity of the axis of the drill receiving bore of the adjusted tooling bushing with respect to the axis of the locator opening in which it is positioned, adjusting all the tooling bushings in the locator opening to divide said eccentricity equally therebetween, positioning in the remaining openings of the tool and plate pairs of adjustable tooling bushings having drill receiving bores infinitely adjustable over a given area, and adjusting the latter tooling bushings to aline the axes of the drill receiving bores of each pair of bushings.

12. The method of fabricating a tool having openings therein corresponding to fastening openings in a plate including the steps of forming in the plate at least one locator opening and in the tool a corresponding locator opening to form at least one pair of locator openings, the locator openings being positioned in the tool and plate to close tolerances, positioning in the pair of locator openings adjustable locator tooling bushings having drill receiving bores infinitely adjustable over a given area, forming in the tool fastening receiving openings and in the plate corresponding fastening receiving openings to form pairs of fastening receiving openings in at least partial alinement, the fastening receiving openings being positioned in the tool and plate to relatively large tolerances, positioning in the pairs of fastening receiving openings pairs of adjustable tooling bushings having drill receiving bores infinitely adjustable over a given area, alining the axis of the drill receiving bore of at least one locator tooling bushing concentrically with the locator opening in which it is positioned, alining the tool with the plate, securing the tool and plate together in alined position, adjusting the second locator tooling bushing to aline its drill receiving bore with the drill receiving bore of the first locator tooling bushing, measuring the eccentricity of the drill receiving bore of the second locator tooling bushing with respect to the locator opening in which it is positioned, adjusting all the locator tooling bushings to divide said eccentricity equally therebetween, alining the drill receiving bores of at least one pair of locator tooling bushings and adjusting the pair of tooling bushings in the fastening receiving openings to aline the drill receiving bores of the latter pair of tooling bushings.

13. The method of fabricating a tool as set forth in claim 12 wherein the tooling bushings in the fastening receiving openings are adjusted to provide edge spacings between the drill receiving bores of the tooling bushings in the tool and the edge of the tool equal to the edge spacings between the drill receiving bores of the corresponding tooling bushings in the plate and the edge of the plate.

14. The method of fabricating a drilling tool having therein fastener positioning openings corresponding to fastener openings in a master tool including the steps of, forming in the drilling tool fastener positioning openings to relatively large tolerances, positioning in the openings in the drilling tool adjustable tooling bushings having drill receiving bores infinitely adjustable over a given area, alining the drilling tool and the master tool, and adjusting the tooling bushings in the drilling tool to aline their drill receiving openings with the axes of the fastener positioning openings in the master tool.

15. The method of fabricating a drilling tool having therein fastener positioning openings corresponding to fastener openings in a master tool including the steps of, forming in the drilling tool fastener positioning openings to relatively large tolerances, positioning in the openings in the drilling tool adjustable tooling bushings having drill receiving bores infinitely adjustable over a given area, alining the drilling tool and the master tool, securing the drilling tool and master tool together, and adjusting the tooling bushings in the drilling tool to aline their drill receiving openings with the axes of the fastener positioning openings in the master tool.

16. The method of fabricating a tool having openings therein corresponding to fastener openings in a plate including the steps of, forming in the plate a locator opening and in the tool a corresponding locator opening to form a first pair of locator openings, forming in the plate a second locator opening and in the tool a corresponding second locator opening to form a second pair of locator openings, positioning in each of the locator openings an adjustable locator tooling bushing having a drill receiving bore infinitely adjustable over a given area, forming in the tool secondary openings and in the plate corresponding secondary openings to form pairs of secondary openings in at least partial alinement, positioning in each of the secondary openings an adjustable tooling bushing having a drill receiving bore infinitely adjustable over a given area, alining the drill receiving bores of the locator tooling bushings in the first pair of locator openings and the drill receiving bore of the first of the locator tooling bushings in the second pair of locator openings concentrically with the locator opening in which said bushings are positioned, alining the drill receiving bores of the locator tooling bushings in the first pair of locator openings and securing said bushings in such alined position, alining the plate and the tool, securing the plate and tool together, adjusting the second locator tooling bushing in the second pair of locator openings to aline its drill receiving bore with the drill receiving bore of the first locator tooling bushing in said second pair of locator openings, measuring the eccentricity of the drill receiving bore of said second locator tooling bushing with respect to the locator opening in which it is positioned, adjusting all the locator tooling bushings to divide said eccentricity equally therebetween, alining the drill receiving bores of the locator tooling bushings in the pairs of locator openings, securing the tool and plate together in such alined position, and adjusting the pairs of tooling bushings in the pairs of secondary openings to aline the drill receiving bores of said pairs of tooling bushings.

17. The method of fabricating a tool having openings therein corresponding to fastening openings in a plate including the steps of, forming in the plate a locator opening and in the tool a corresponding locator opening to form a first pair of locator openings, forming in the plate a second locator opening and in the tool a corresponding second locator opening to form a second pair of locator openings, the two pairs of locator openings being positioned in the tool and plate to close tolerances, positioning in each of the locator openings an adjustable locator tooling bushing having a drill receiving bore infinitely adjustable over a given area, forming in the tool secondary openings and in the plate corresponding secondary openings to form pairs of secondary openings in at least partial alinement, the secondary openings being positioned in the tool and plate to relatively large tolerances, positioning in each of the secondary openings an adjustable tooling bushing having a drill receiving bore infinitely adjustable over a given area, alining the drill receiving bores of the locator tooling bushings in the first pair of locator openings and the drill receiving bore of the first of the locator tooling bushings in the second pair of locator openings concentrically with the locator opening in which said bushings are positioned, alining the drill receiving bores of the locator tooling bushings in the first pair of locator openings and securing said bushings in such alined position, alining the plate and the tool, securing the plate and tool together, adjusting the second locator tooling bushing in the second pair of locator openings to aline its drill receiving bore with the drill receiving bore of the first locator tooling bushing in said second pair of locator openings, measuring the eccentricity of the drill receiving bore of said second locator tooling bushing with respect to the locator opening in which it is positioned, adjusting all the locator tooling bushings to divide said eccentricity equally therebetween, alining the drill receiving bores of the locator tooling bushings in the pairs of locator openings, securing the tool and plate together in such alined position, and adjusting the pairs of tooling bushings in the pairs of secondary openings to aline the drill receiving bores of said pairs of tooling bushings.

18. A tooling bushing including, a collar having a depending circular neck and a longitudinal bore eccentric of the neck, a circular sleeve received for rotation in the longitudinal bore and having an eccentric bore, an external flange on one end of the sleeve adjoining the lower end of the depending collar neck, and a locking nut on the end of the sleeve opposite the flange.

References Cited in the file of this patent

UNITED STATES PATENTS

| | | |
|---|---|---|
| 888,826 | Kooken | May 26, 1908 |
| 2,367,582 | Honyoust | Jan. 16, 1945 |
| 2,381,943 | Williams | Aug. 14, 1945 |
| 2,387,986 | Evans | Oct. 30, 1945 |
| 2,424,485 | Miller | July 22, 1947 |
| 2,497,679 | Maples | Feb. 14, 1950 |

FOREIGN PATENTS

| | | |
|---|---|---|
| 575,360 | Great Britain | Feb. 14, 1946 |